United States Patent [19]
Bass

[11] Patent Number: 4,534,112
[45] Date of Patent: Aug. 13, 1985

[54] ANTI-KERF BIND DEVICE

[76] Inventor: David L. Bass, 3201 Martin Johnson, Chespeake, Va. 23323

[21] Appl. No.: 476,793

[22] Filed: Mar. 18, 1983

[51] Int. Cl.³ .................... B27B 17/00; B27B 21/00
[52] U.S. Cl. .................... 30/383; 30/166 R; 30/514; 83/102.1
[58] Field of Search .............. 30/383, 384, 371, 373, 30/376, 166 R; 83/102.1; 145/31 R, 31 C, 35 R, 31 AB, 31 B, 135 R

[56] References Cited
U.S. PATENT DOCUMENTS

| | | | |
|---|---|---|---|
| 194,259 | 8/1877 | Overhiser | 83/102.1 |
| 1,097,362 | 5/1914 | Price | 30/371 |
| 1,435,252 | 11/1922 | Neal | 83/102.1 |
| 1,602,040 | 10/1926 | Neal | 83/102.1 |
| 3,042,088 | 7/1962 | Filion | 30/383 |
| 3,656,519 | 4/1972 | Stackhouse | 83/102.1 |

Primary Examiner—Jimmy C. Peters
Attorney, Agent, or Firm—William F. Frank

[57] ABSTRACT

The present invention comprises a pair of wheels mounted on a stub shaft, the outer surfaces of the wheels being bevelled to facilitate entering into a kerf. The wheels are mounted in a slot formed in the blade of a woodcutting implement which carries the cutting teeth.

6 Claims, 7 Drawing Figures

ANTI-KERF BIND DEVICE

FIELD OF INVENTION

The present invention lies in the field of woodcutting implements, and more particularly as improvements in woodcutting implements having toothed cutting elements.

BACKGROUND OF THE INVENTION AND PRIOR ART

When cutting through wood, particularly large size timbers and trees, the kerf produced by the cutting implement as the cut is produced due to improper balancing of the material being cut, or in the case of live trees, as it is not always possible to properly brace the tree for the cutting. When such binding of the cutting blade by the kerf occurs, it becomes impossible to continue to use the implement until the material being cut is moved so that the kerf will open up again.

The simplest device for preventing kerf from binding the cutting blade is to use a wedge above the cutting blade. However, in many instances, this is not always possible because the thickness of the material being cut may be such that the wedge cannot be inserted above the cutting blade before binding in the kerf occurs. U.S. Pat. No. 3,042,088 discloses the use of a device mounted on the housing of a chain saw which has a bevelled wheel operating on a slidable bar which in turn is pivotally mounted to the housing to spread the kerf. This device would appear suitable providing that the kerf spreader can be inserted into the kerf before the actual binding of the chain saw blade bar occurs. In many instances in cutting small diameter trees and limbs, the binding can occur before the kerf is the depth of the chain saw blade bar. Also, this type of device would not appear to be useable with any other woodcutting implement but a chain saw.

SUMMARY OF THE PRESENT INVENTION

The present invention is applicable to all forms of saws used for cross cut wherein the saw teeth are angled outward from the blade bearing them so that the kerf produced by the cutting edges of the teeth is actually wider than the blade bearing the teeth. In summary form, the present invention comprises a pair of wheels mounted on a stub shaft, the outer surfaces of each wheel being bevelled to a substantial feather edge of the periphery. The wheels are spaced apart slightly more than the thickness of the blade bearing the cutting teeth, and the overall width of the pair of wheels is equal to, or fractionally less, than the total width of the cutting surface. The device is mounted in a slot formed in the blade carrying the cutting teeth. When the kerf tends to close in on the saw blade carrying the cutting edges, the walls of the kerf come in contact with the outer surface of the device which is held then and acts as a pivot point about which the cutting edges can be rotated and the cutting bar can be moved laterally along the slot.

BRIEF DESCRIPTION OF THE DRAWINGS

The present invention is shown in the following drawings by way of illustrative embodiment only and in no way is to be considered as restrictive of the scope of the present invention.

DETAILED DESCRIPTION OF THE INVENTION

Figure 1:
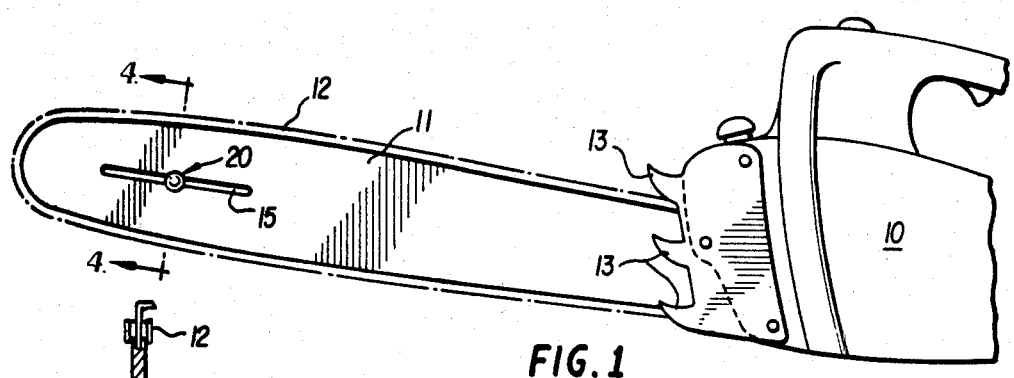
FIG. 1 illustrates the employment of the device of the present invention in combination with a chain saw.

In FIG. 1, the invention is employed with a typical chain saw 10 having a chain saw blade bar 11 on which the chain saw blade 12 is rotatably mounted in a well-known fashion and in no way is restrictive in connection with the present invention. Chain saw 10 is equipped with conventional bucking spurs 13 which assist in controlling the movement of the saw through the wood. The forepart of the bar 11 has a slot 15 which is of a width generally dependent somewhat upon the size of the saw, but in most instances, it is believed that the width of approximately 5/16" would be adequate. The slot 15 is located in the first third of the blade from the outer end of the bar and, depending upon the size of the bar, would be at least six inches long and could extend up to perhaps as much as ten inches on a large woodcutter's saw. Within the slot 15 is emplaced the principal element of this invention which comprises a wheel assembly indicated as 20. 20 comprises a pair of wheels 24 and 24' which are secured to the end of an axle 23. The diameter of the axle 23 should be slightly less than the width of the slot 15 so that there is free movement of the bar 11 when the kerf is in contact with the wheel assembly 20. It is to be noted that the overall width of the wheel device 20 is slightly less than the width of the chain saw blade 12. The wheels are secured to the ends of the shaft 20 in any suitable well-known manner either by force fit, adhesively, or in the event of an elaborate larger wheel which might be required because of the size of the blade, could even be held with a lock ring.

Figure 4:
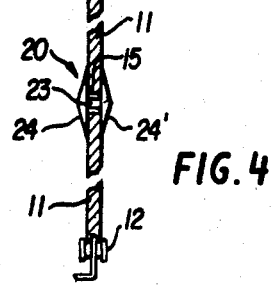
FIG. 4 is a partial cross-sectional view along the plane 4—4 in FIG. 1.
Figure 3:
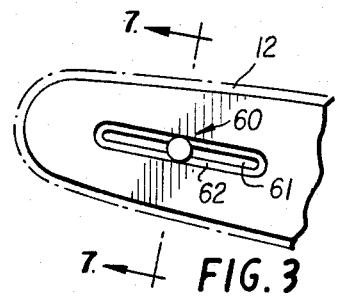
FIG. 3 illustrates a second embodiment of the present invention with a chain saw.
Figure 2:
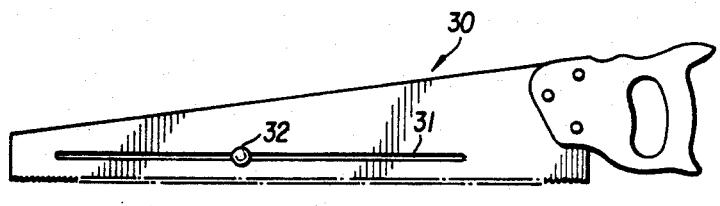
FIG. 2 illustrates the device of the present invention in combination with a conventional hand saw.

Referring now to FIG. 2, it will be noted that the conventional cross-cut hand saw 30 has a slot 31 which is considerably longer than the slot which would normally be required with a chain saw. This is because with any hand-type saw, the cutting can be accomplished only by movement of the saw blade perpendicularly to the axis of the material being cut, and obviously the longer the stroke, the more efficient is the cutting. The antibind wheel device 32 is constructed substantially as shown for FIG. 1 and in FIG. 4, but the width again would be less because the width of the cutting teeth on the saw blade is less that that of a chain saw.

Figure 5:
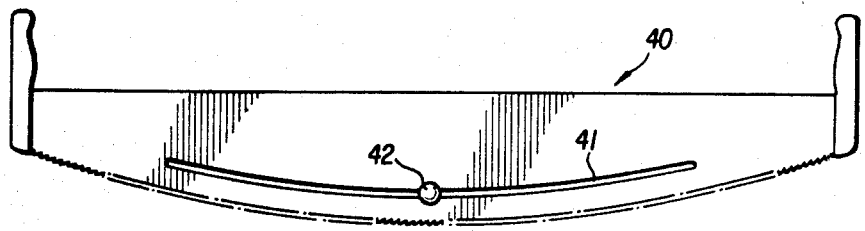
FIG. 5 illustrates the employment of the present invention with a typical woodsman timber saw.

Referring to FIG. 5, there is shown a conventional two-man timber saw, but the same principal could be applied to a one-man timber saw. In this instance, the saw 40 carries an arcuate slot 41 in which is mounted the anti-bind wheel device 42. The reason for the arcuate slot which follows the curvature of the cutting teeth is that in this type of saw the maximum effect of cutting is obtained by a rocking motion and it is important, therefore, that this principal be adhered to when employing the device.

Figure 6:
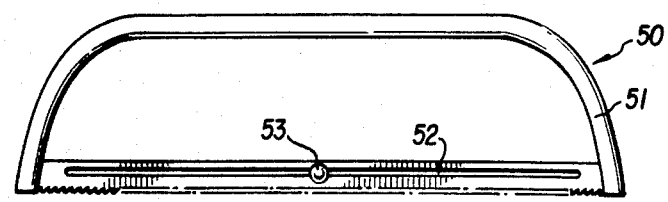
FIG. 6 illustrates the employment of the present invention in combination with another type of timber saw.

Referring now to FIG. 6, it is to be noted that there is shown here a bow-type timber saw and the slot in the cutting blade timber saw 50 having a familiar bow-type handle 51. In this instance, the slot 52 in the saw blade 53 is elongated as in FIG. 2 and for the same purpose. The wheel device for this type of saw would be substantially the same as that in FIG. 2 in size.

In using the invention, the discussion will be restricted to employment of the device as shown in FIG. 1, but the principles are equally applicable for FIGS. 2, 5 and 6. In using the chain saw the cut is made until such time as the kerf begins to close at which point the size of the kerf impinge upon the outer surface of the anti-bind wheel assembly 20. At this point, the wheel assembly 20 is locked in the kerf. The operator continues to utilize the saw by sliding it back and forth as necessary over the shaft 23 and by pivoting the saw around the anti-bind wheel assembly 20 which is firmly held in the kerf. Usually, when the cut has been completed, the kerf will release the anti-bind device. In some instances, however, it may be necessary to make a 360° cutting pivot with the saw blade in order to completely free the kerf as the timbers fall apart.

The anti-bind wheel device can be placed in any existing saw by making the necessary slot in the saw blade and then assembling the anti-bind wheel device in the slot. The outer surface of the wheels 24 and 24' need not be completely brought to a feathered edge as indicated in FIG. 5, but in fact could be circular discs. However, it has been found that a bevelled edge moves more smoothly through the kerf and is less likely to become a pivot point before the kerf would actually bind the wheel device.

Figure 7:
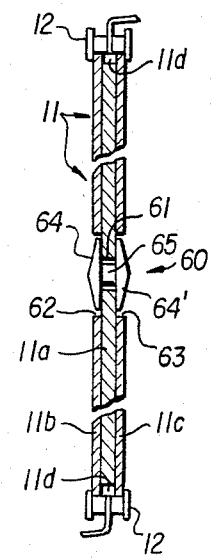
FIG. 7 is a cross-section view along plane 7—7 in FIG. 3.

The second embodiment of the present invention as shown in FIG. 7 involves making two slots in the chain saw blade bar 11. The blade bar 11 comprises a core plate 11a which gives rigidity and strength to the bar and side plates 11b and 11c. The side plates have a width greater than the width of the core plate and when assembled to the core plate provide a raceway for the chain saw blade 12. A slot 61 is formed in the core plate 11a substantially identical to the slot 15 in FIG. 1. Slots 62 and 63 are formed in the side plates 11b and 11c respectively. These latter slots have a width greater than the width of slot 61 so as to position wheels 64 and 64' within the slots 62 and 63 in rolling contact with the respective surfaces of the core plate 11a. Wheels 64 and 64' are assembled within slots 61, 62 and 63 by attachment to stub shaft 65 as was described for wheel assembly 20 in FIG. 1 in order to form wheel assembly 60.

What is claimed is:

1. An anti-kerf-bind-device for use with wood cutting implements having a blade with cutting edges thereon comprising a pair of opposing, spaced wheels mounted on a shaft which has been inserted into a slot in the blade carrying the cutting edges, said wheels being secured to their respective end portions of said shaft on each side of said blade, the inner surface of each wheel being in slidable contact with the adjacent, respective blade surface.

2. A woodcutting implement having cutting teeth on at least one edge of a metal bar, a slot formed in said bar, and a wheel assembly/comprising a pair of opposing, spaced wheels secured to their respective end portions of a stub shaft which has been mounted in said slot, the inner surface of each wheel being in slidable contact with the adjacent, respective bar surface.

3. The woodcutting implement according to claim 2 wherein the overall width of said wheel assembly is equal to or slightly less than the overall width of the cutting teeth.

4. The woodcutting implement according to claim 2 wherein said implement is a chain saw, said cutting teeth being interconnected to form a continous chain of cutting teeth slidably encircling all edges of said bar.

5. The woodcutting implement according to claim 2 wherein said implement is a cross-cut hand saw.

6. The woodcutting implement according to claim 2 wherein said implement is a woodcutter's saw.

* * * * *